(12) United States Patent
Holbrook

(10) Patent No.: US 7,133,914 B1
(45) Date of Patent: Nov. 7, 2006

(54) STATISTICS-PRESERVING ACL FLATTENING SYSTEM AND METHOD

(75) Inventor: Hugh Holbrook, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 575 days.

(21) Appl. No.: 10/001,615

(22) Filed: Oct. 31, 2001

(51) Int. Cl.
G06F 11/30 (2006.01)
G06F 17/30 (2006.01)

(52) U.S. Cl. .................. 709/224; 713/201; 713/154; 705/14; 705/51; 707/1; 707/3; 707/10

(58) Field of Classification Search ........ 709/223–226, 709/206, 246, 215, 219; 707/1, 9–10, 3, 707/103; 711/216; 386/96; 713/201; 705/14, 705/51, 57
See application file for complete search history.

(56) References Cited

U.S. PATENT DOCUMENTS

| | | | | |
|---|---|---|---|---|
| 5,838,874 A * | 11/1998 | Ng et al. | ........................ | 386/96 |
| 5,875,352 A * | 2/1999 | Gentry et al. | ................. | 710/23 |
| 5,875,484 A * | 2/1999 | Neuhard et al. | ............. | 711/167 |
| 5,887,274 A * | 3/1999 | Barry et al. | ................. | 707/202 |
| 6,279,112 B1 * | 8/2001 | O'Toole et al. | ............. | 713/201 |
| 6,381,602 B1 * | 4/2002 | Shoroff et al. | ................. | 707/9 |
| 6,615,216 B1 * | 9/2003 | Hu | .............................. | 707/101 |
| 6,625,591 B1 * | 9/2003 | Vahalia et al. | .................. | 707/1 |
| 6,643,260 B1 * | 11/2003 | Kloth et al. | ................. | 370/235 |
| 6,651,096 B1 * | 11/2003 | Gai et al. | ..................... | 709/223 |
| 6,996,058 B1 * | 2/2006 | Foster et al. | ................. | 370/228 |

* cited by examiner

*Primary Examiner*—David Wiley
*Assistant Examiner*—Jude J Jean-Gilles
(74) *Attorney, Agent, or Firm*—Campbell Stephenson Ascolese LLP (57) ABSTRACT

A method and system transforms one or more lists for a data communications system into a single list, each list of the one or more lists including a plurality of entries. The method includes removing non-terminating entries from the plurality of entries in the one or more lists, the removing each non-terminating entry removing all but a last non-terminating entry in any of the one or more lists; and eliminating from the plurality of entries one or more entries that provide for one or more impossible actions, wherein the removing of non-terminating entries and the eliminating of one or more entries that provide for impossible actions, if any, produce a single list preserving tracing of the entries in the single list to the plurality of entries.

18 Claims, 5 Drawing Sheets

STATISTICS-PRESERVING ACL FLATTENING SYSTEM AND METHOD

CROSS-REFERENCE TO RELATED APPLICATION

This application is related to U.S. patent application Ser. No. 09/295,187 entitled "Method and Apparatus for Organizing, Storing and Evaluating Access Control Lists" to Keith McCloghrie, Silvano Gai and Bushan Kanekar filed Apr., 20, 1999 and assigned to the assignee of the present application and is incorporated herein for all purposes.

BACKGROUND OF THE INVENTION

1. Field of the Invention

This invention relates to the field of data memories, and more particularly relates to techniques for efficient routing of data through a data communication network.

2. Description of the Related Art

A data communications network is the interconnection of two or more communicating entities (i.e., data sources and/or sinks) over one or more data links. A data communications network allows communication between multiple communicating entities over one or more data communications links. High bandwidth applications supported by these networks include streaming video, streaming audio, and large aggregations of voice traffic. Data communication systems use a number of different known protocols. One protocol for high speed communication is a synchronous optical network (SONET) protocol. Another protocol commonly used in local area networks (LAN), is a Carrier Sense Multiple Access with Collision Detection (CSMA/CD) protocol. One version of the CSMA/CD protocol is the IEEE 802.3 standard referred to as Ethernet. Ethernet networks typically include network equipment that transmits the data packets arranged in frames across various paths. At junctions in a network path, routers or switches handle the data. Typically, each router or switch applies one or more filters, each implemented as an Access Control List (ACL) to each packet received to determine how to handle the packet. For uses herein, an ACL refers to both an "Access Control List" and to an "Action Control List" and, where appropriate, embodiments described herein are not limited to an "access".

In general, an ACL is a list of true/false tests that are applied to fields in a packet, and associated actions in the event that a test is determined to be true. Each test or entry in an ACL is referred to as an Access Control Entry (ACE). An ACL may be viewed as a set of ACEs that define and execute permissions. An ACL typically may also provide data including an array of ACEs, and a count of the number of ACEs in the ACL. An ACL may have one or more ACEs, with each ACE including a permission access type, such as allowed, denied, or other relevant access types.

An ACE entry may contain members that specify the type of the ACE, the action to be taken when the ACE is matched, and a description of the "match condition" for the ACE. The match condition is generally represented as a value and mask for certain fields in a packet header, although other match conditions are possible, such as specifying a numerical range of allowable values for some field in the packet header. Each ACE also specifies a "continuation" action that is used when a packet matches the ACE's match condition. There are two possible values for the continuation condition: "terminate" and "skip". If the action is "terminate" then processing stops immediately and subsequent ACLs are not considered. If the action is "skip," then the action associated with the current ACL is taken and processing resumes at the next ACL in the ACL list, looking for the first matching ACE in that list. The continuation is not generally specified directly by the user; rather, it is typically an implied property based on the specific Action type of the ACE. A "Security Deny" action in the prior art has an implied continuation action of "terminate" to indicate that the packet should be summarily dropped and no further action should be taken. An ACE whose action is "Security Permit and Log" would have a continuation action of "skip" to indicate that processing should continue with the next ACL in the ACL list. The "skip" continuation action is used to allow multiple higher-level functions (for example, security logging and redirection to a web cache) to be applied to a single packet.

An ACE entry may further be limited to four parts, such as a test, an action, an action continuation, and a "hit counter" type statistics parameter. A test may be a Boolean expression specified in terms of the fields in a packet, for example, the Boolean expression may be a field in a packet header such as the IP source address destination address and a port number, for a higher layer protocol such as TCP or UDP. The test returns a true or false. An action on an ACE may include dropping a packet immediately, permitting a packet to be forwarded, or redirecting a packet to some element of a router or to a separate device for special processing such as encryption, logging of the packet, translating network addresses, or performing intrusion detection. An element of a router that performs the special processing may be, for example, a line card, a processor, or an external device.

ACLs provide for a packet filtering capability. An ACL specifies a set of tests to be applied to a packet and an associated action or set of actions to be taken when a test returns true. The packet filtering capability is used, among other things, to enforce a security policy that prevents unwanted or unsafe packets from passing through a network device where the ACL has been applied. An ACL can be used to restrict or grant access to the packets sent to or from a particular user, network host, group of users, or group of network hosts. In one respect, ACLs are ordered sets of ACEs. Several ACLs may be instantiated at the same time with the same ACE appearing in two different ACLs because ACEs are not shared between ACLs. The sequence in which ACLs are applied is determined according to a plurality of methods. In general, for example, a sequence of ACLs must apply "skip" entries in the ACL that direct skipping to a next ACL to look for a matching entry.

Figure 1:
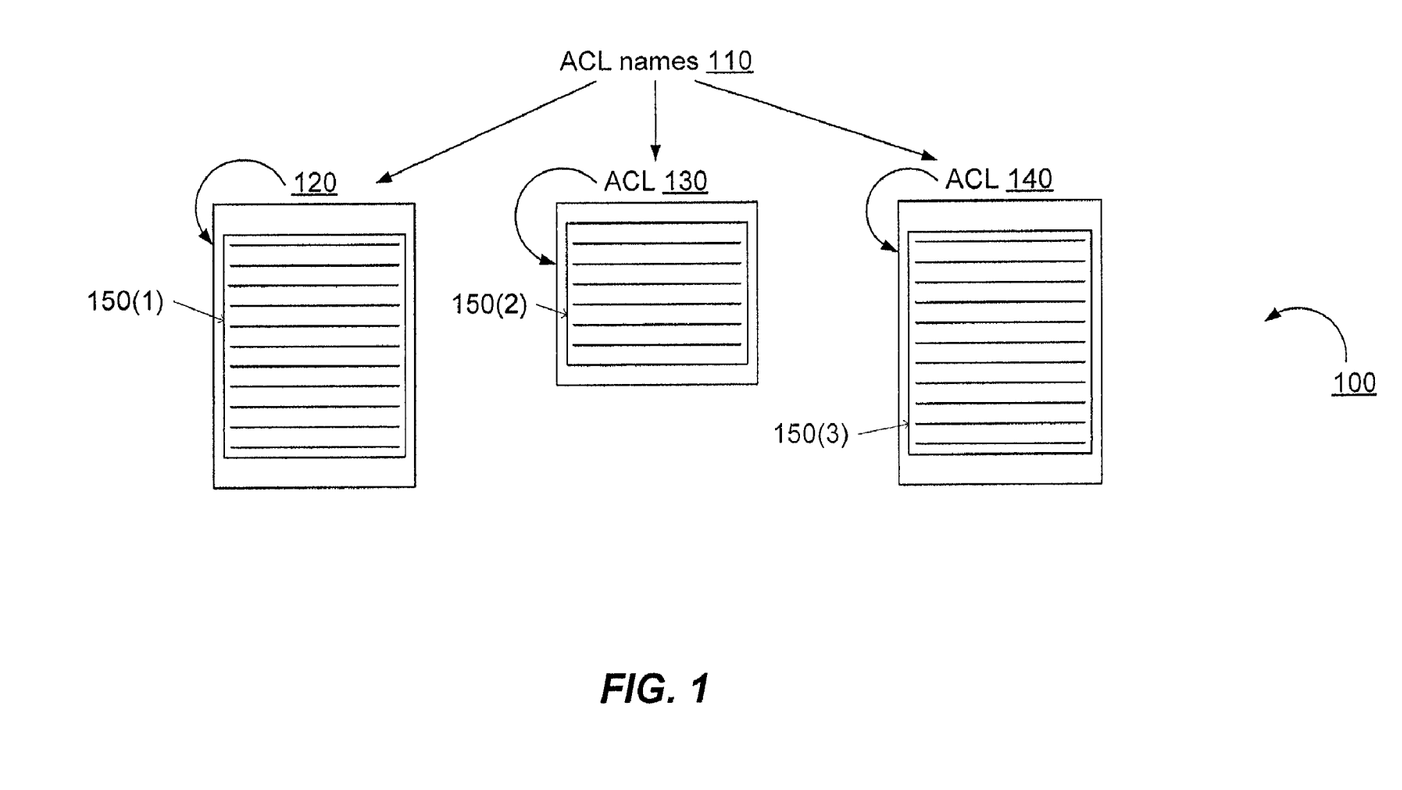
FIG. 1, labeled "prior art" illustrates a diagram showing several Action Control Lists (ACLs) and corresponding Action Control Entries (ACEs).

Referring to FIG. 1, a diagram 100 illustrates the relation between ACLs and ACEs. Each ACL is given a name 110. Each ACL 120, 130 and 140 includes a plurality of ACEs. ACL 120 includes ACEs 150(1); ACL 130 includes ACES 150(2); and ACL 140 includes ACEs 150(3).

A Content Addressable Memory (CAM) may be used to process ACLs. A CAM is a specialized memory device that is used for fast searches of data stored therein. In some networking systems, CAMs are used for a plurality of purposes. For example, a CAM may be used to store a switch port associated with a specific IEEE 802.3 host address in an IEEE 802.1d bridge. Additionally, a CAM can be configured to receive data representing Action Control Lists (ACLs) and operate on them. Generally, a CAM's architecture includes a table of memory cells to store data and control logic to search and compare the data in the table. To search for data, a system provides the data to be searched and the control logic of the CAM performs the search and provides search results to the system. Two types of CAMs are binary CAMs and Ternary CAMs (TCAMs). A binary CAM searches for and recognizes data that is comprised of bits that can have two states, 0 and 1. In general a TCAM searches for and recognizes three states: 0, 1, and X ("don't care"). Also, TCAMs can be configured to search for matching entries in a network environment. For example, if provided a pattern of 0s and 1s, the TCAM can search for a matching entry. Each entry in a TCAM may be individually configured such that different degrees of a match are acceptable, i.e., such that some of the bits of the entries are "don't care" bits, thereby allowing the TCAM to ignore some of the fields in the packet while matching an entry.

A TCAM is one type of CAM that provides hardware support for evaluating ACLs. Prior to being stored in a TCAM, however, ACLs require processing and reorganization. Translating multiple ACLs presents difficulties for matching entries using a TCAM, which matches a binary string presented as an input with each row of the TCAM. In particular, an important translation that must happen is that a sequence of ACLs must be translated into an equivalent single ACL due to the inability of a TCAM to process a "skip" entry. TCAMs do not support skipping over a section of the TCAM to continue processing later in the TCAM. An ACL with an ACE providing for such a "skip" requires that any remaining action in an ACL be skipped and the next ACL on an interface be processed. Examples of ACE entries that are skip entries include a permit entry on a security-type ACL, such an entry may have an associated action, for example "permit log," indicating to permit the packet for further processing and to record in a packet "log" that this packet arrived. In contrast, a "deny" ACE in a security-type ACL or a "permit" ACE in a feature-type ACL are types of "terminal" ACLs. A terminal ACE terminates processing immediately with some action when a match is detected. Prior art methods of merging ACEs of one or more ACLs lose the ability to track the number of matches detected by the TCAM related to the original ACLs, along with other statistics related to any user-specified ACLs. For purposes of this disclosure, "statistics" refers to data concerning the operation of an ACL and the ACE entries therein. For example, as one of ordinary skill in the art will appreciate, a known statistic is the data stored in a "hit counter" or "match counter" and variations of a "hit counter," for example, a counter of matches within a particular time period or a counter of bytes.

The speed at which the ACL comparison can be done is often a key factor in determining the overall packet forwarding rate of a router. For example, according to prior art methods, if a router applies two ACLs to every packet, then the router requires either two TCAMs operating in parallel or every packet must be passed twice through a single TCAM. Neither of the prior art solutions are efficient because using a same TCAM twice per packet effectively halves the forwarding rate of the device. And, requiring two TCAMs dramatically increases hardware costs of the router by requiring an extra TCAM and associated board space, increased power usage, and increased pin count.

Thus, there is a need to combine ACLs into a single ACL that preserves statistics and the order in which the ACEs are performed. What is needed is a system and method that transforms a plurality of ACLs into a single ACL and efficiently reduces the number of actions performed and takes into account the statistics of the ACLs.

SUMMARY

Accordingly, a method and system transforms one or more lists for a data communications system into a single list, each list of the one or more lists including a plurality of entries. The method includes removing non-terminating entries from the plurality of entries in the one or more lists, the removing each non-terminating entry being independent of a last non-terminating entry in any of the one or more lists; and eliminating from the plurality of entries one or more entries that provide for one or more impossible actions, wherein the removing of non-terminating entries and the eliminating of one or more entries that provide for impossible actions, if any, produce a single list preserving tracing of the entries in the single list to the plurality of entries.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention defines a method of altering a list of Action Control Lists (ACL) while preserving the ability to record statistics, such as "hit counters" of the ACL. In a network environment, ACLs are typically implemented to filter data packets for security purposes. An ACL is evaluated and its ACEs examined to determine whether the ACEs match the contents of a packet. Some ACLs in a network environment provide additional actions, such as filtering, packet classification for quality of service (QoS), rate limiting, and cryptography. The U.S. patent application Ser. No. 09/295,187, cross-referenced above, provides an improvement of typical ACLs by providing a method of implementing an ACL using a Boolean function to remove redundant ACEs from ACLs and merge ACLs together. Rather than removing redundant ACEs by merging entries, an embodiment of the present invention is directed to preserving statistics, for example, hit statistics, by "flattening" one or more ACLs instead of "merging" the ACEs. "Flattening" hereinafter refers to "flattening a list of ACLs, and the single list that it produces is referred to as a "flattened" ACL. Another embodiment is directed to a method for removing one or more redundant ACEs from a set of ACLs.

Some embodiments of the present invention are directed to an ACL flattening method and system for reducing a list of user-specified ACLs that have been applied to a single interface of a switch, for example, and producing a single equivalent list that is in a format for directing to a TCAM. Further, embodiments are directed to eliminating unreachable CAM entries.

Overview

Embodiments of the present invention describe a system and method for transforming a plurality of ACLs into a single ACL. The single ACL advantageously is in a form that allows a TCAM or similar device to perform a single lookup, and, for each packet, determine the full set of entries that would have been matched had the full original list of ACLs been applied in sequential order.

In an embodiment, the transformation of the plurality of ACLs is accomplished by a recursive process of combining two ACLs and eliminating "skip" entries. Advantageously, the transformation allows the use of a TCAM or similar device to perform high-speed processing complex feature sets that would otherwise require multiple ACLs to describe, thereby enabling a highly functioning router, without incurring the performance cost of multiple TCAM lookups on every packet. In a high-function router every packet must potentially be compared against the full original list of ACLs.

System Architecture

Figure 2:
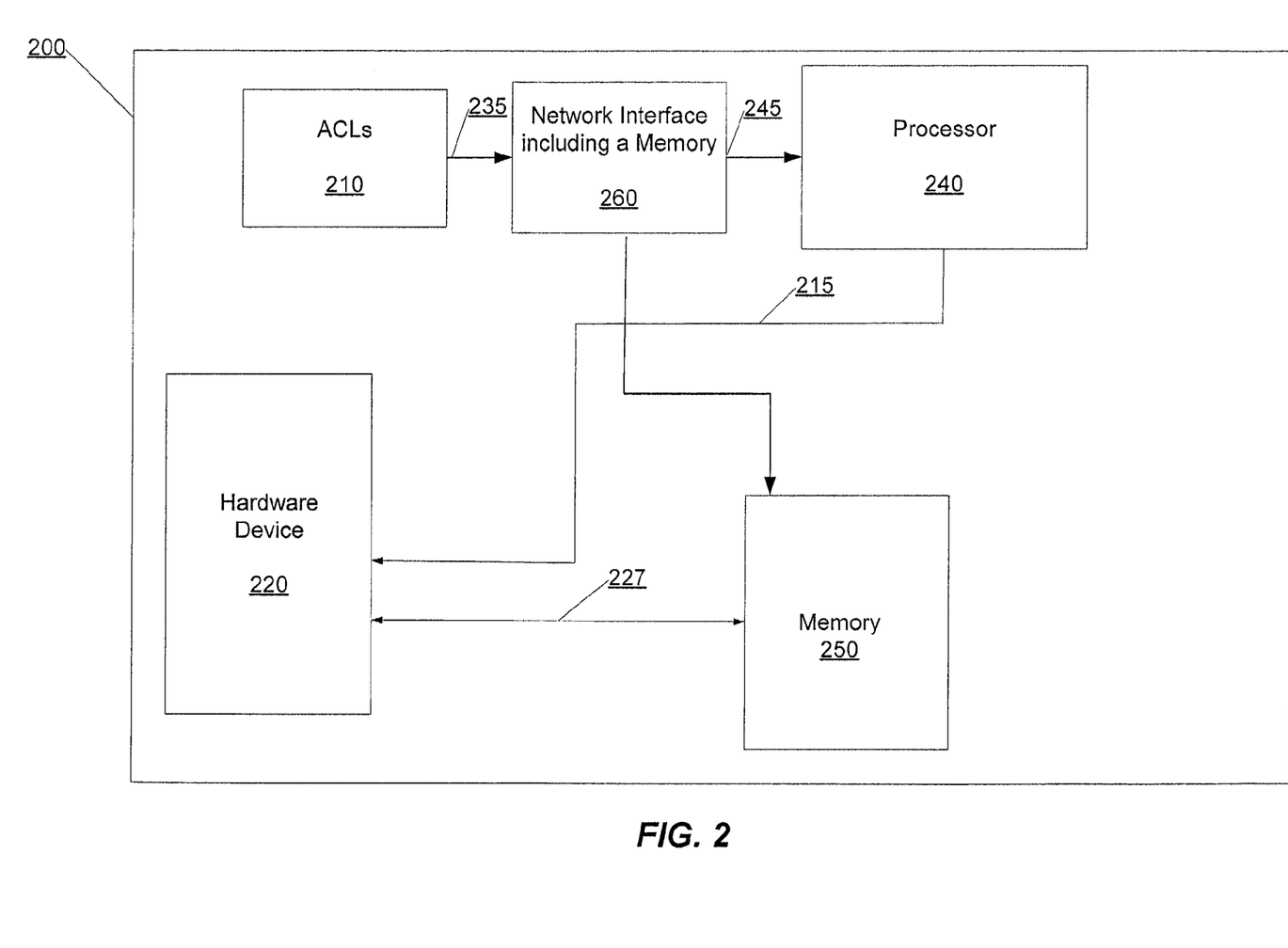
FIG. 2 illustrates an example of a system incorporating flattened Action Control Lists (ACLs) in accordance with an embodiment of the present invention.

FIG. 2 illustrates an example of a system incorporating flattened Action Control Lists (ACLs) for processing by a ternary content-addressable memory (TCAM) according to an embodiment of the present invention. System 200 includes a network interface 260 that provides input/output packet processing and appropriate protocol-related interfaces for system 200. Within network interface 260 is a processor 240. Processor 240 is coupled to various system components via a link 215. Link 215 carries various system signals (e.g., data, control, address and the like). For illustration purposes, a common link, link 215 is described. However, it will be apparent to one skilled in the art that link 215 can be configured using various data transport techniques (local bus, multiplexed bus, switching fabric or the like).

A hardware device 220 is coupled to processor 240. Hardware device 220 may be a ternary content addressable memory (TCAM) or another device that is capable of computing a large number of Boolean expressions in parallel and return an index of a first matching entry. Hardware device 220 is coupled to receive data, such as flattened ACLs, from processor 240 via link 215. Memory 250 can be configured using any storage scheme (individual memory module, buffer registers, embedded memory module in hardware device 220 or the like). Memory 250 is coupled to hardware device 220 and network interface 260.

Referring to FIG. 2, a packet flowing through network interface 260 may have multiple ACLs applied to it. For example, a set of "security ACLs" that drop unauthorized packets may be applied to implement a firewall. ACLs may also be specified to identify a subset of packets requiring special processing. For example, packets identified as suspicious may be redirected or copied to an intrusion detection system. Also, confidential packets destined to a remote site connected over an untrusted network may be redirected by an ACL to an encryption engine. An ACL may also redirect web request packets to a transparent web cache.

Each packet entering network interface 260 has the ACLs 210 applied to each packet flowing through network interface 260 in a user-specified order. Within each ACL, the ACEs are applied in order to determine if the packet matches each ACE. The action associated with the first matched ACE is taken and the associated ACE "hit counter" is incremented. If an ACE is matched, the associated "continuation" action is then examined. If the continuation action is "terminate," no further action is taken and no further ACLs are examined with regard to that packet. If the continuation action is "skip" then the remaining ACEs in the current ACL are skipped, and the ACL processing continues at the beginning of the next ACL in the sequence. In a highly functioning ACL, a continuation action makes a distinction between skip actions and terminate actions to efficiently implement ACL lookups.

A highly functioning ACL provides additional functions beyond security functions. The additional functionality may cause a user to impose more than one ACL to a network interface 260, the additional functionality being implemented via a second ACL. Within an ACL for which a second ACL is present, there may be at least two types of ACEs, a "terminal" ACE and a "skip" ACE. A terminal ACE, when matched, terminates processing immediately with an action. The terminal ACEs are a common type of ACE in an ACL and include either a "deny" security ACL or a "permit" feature ACL. A "skip" ACE, when matched, unlike a terminal ACE, skips over the remaining actions of the ACEs present in an ACL and continues on to the next ACL on a network interface. A permit ACE in a security ACL is a type of skip ACE. A skip ACE may include an associated action, for example, a "permit log" that keeps a log of permitted packets. The present state of the art fails to support skipping of a section of ACEs in an ACL to continue with another ACL when the ACLs are matched in a hardware device, such as a CAM or TCAM. The hardware device generally performs a large number of Boolean expressions in parallel and returns an index of a first matching entry. Even merged ACLs according to the present state of the art fail to account for "skips" in ACLs unless the skip ACE is a last ACE in an ACL. The failure to account for "skips" causes prior art merge methods to ignore the heritage, or full record of the non-merged ACLs, and thereby prevent a network interface from preserving statistics, such as the counts of "hit counters".

Processor 240 implements a method according to an embodiment that reduces a list of user-specified ACLs that were applied to network interface 260. The method produces a single list that is in a format appropriate for hardware device 220 and eliminates entries for the CAM that are unreachable.

More particularly, in one embodiment a method includes encoding one or more ACLs into a single ACL, the single ACL independent of non-terminating instructions; and returning a set of indexes, one for each contributing ACE in the original list of ACLs. As shown in the flow diagram of FIG. 3, block 310 provides for encoding one or more ACLs into a single ACL independent of non-terminating instructions, and in block 320, returning an index of first matches for each ACE in the single ACL.

Figure 3:
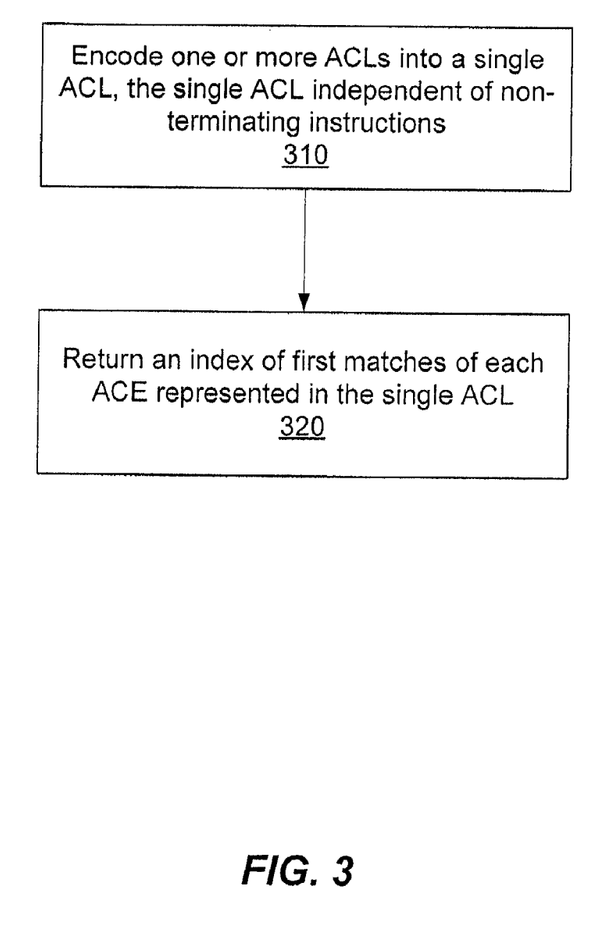
FIG. 3 illustrates a flow diagram for encoding one or more ACLs into a single ACL in accordance with an embodiment of the present invention.

The encoding of ACLs in block 310 to produce a single ACL can be implemented using the cross product of two or more ACLs and iterating over a plurality of ACEs in a first ACL, and for each non-terminating ACE found, performing a combination with the non-terminating ACE and each entry in a second ACL. The combination combines the first and the second ACLs. The method of applying the cross product to ACLs may be repeated and applied recursively for a third or more ACL until each ACL referenced in the one or more ACLs is collapsed into the first ACL. After collapsing the one or more ACLs, the method produces a single ACL with an ACE list that is codeable into a parallel-first match engine, such as hardware device 220. The parallel-first match engine may be a TCAM, a CAM or other hardware device 220 designed as a device capable of computing a large number of Boolean expressions in parallel and return an index of the first matching entry.

Figure 4:
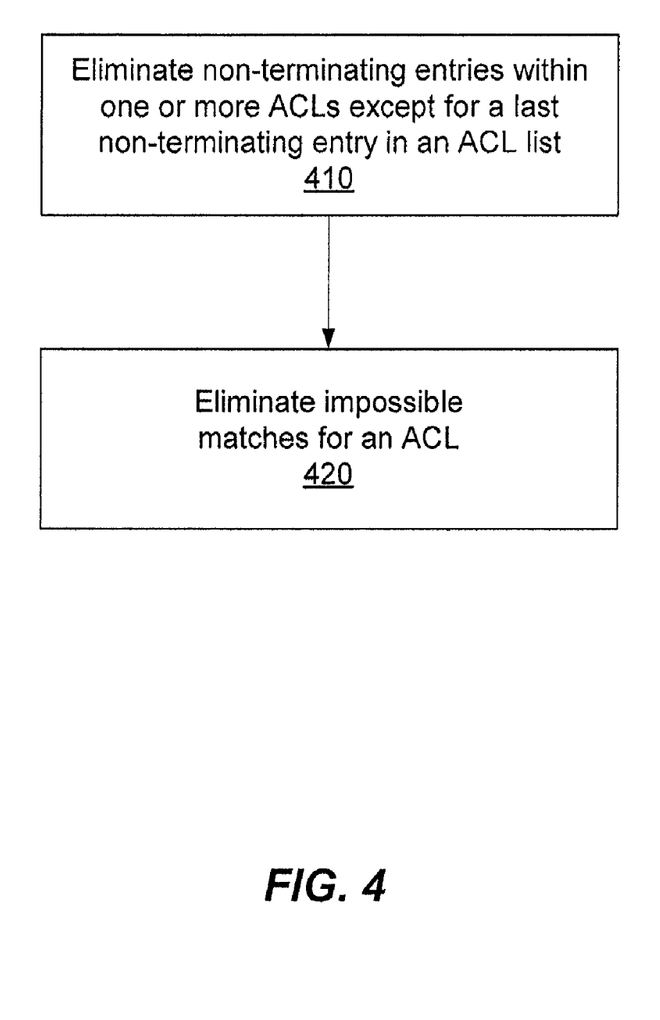
FIG. 4 shows a flow diagram of an implementation of the encoding for FIG. 3 in accordance with an embodiment of the present invention.

In one embodiment, block 310 may be implemented by: (1) eliminating non-terminating entries, also referred to as skip ACEs, within one or more ACLs, the eliminating including eliminating all but a last ACE in an ACL list; and (2) eliminating impossible matches for an ACL. FIG. 4 shows a flow diagram of an implementation of the encoding shown in block 310 of FIG. 3. Block 410 provides for elimination of non-terminating entries, and block 420 provides for eliminating impossible matches.

For exemplary purposes, an ACE may be represented by <c,A> wherein "c" represents a condition c and A represents a set of actions, A={a1, a2, . . . } to be taken when the condition is matched. The a1, a2, etc. illustrates that an ACE may be associated with multiple actions. For example, an ACE may provide for a log or a TCP intercept. More particularly, the set of actions A may include an action directing a "skip" of other entries in an ACL, for example, skipping to a second ACL.

Eliminating skips may be implemented by replacing each skip entry with a sequence of entries. For example, if a skip entry <c1,A1> in a first ACL is located, the entry is replaced with a sequence of entries, e.g., <c1 && c2, A1 U A2> for each ACE <c2,A2> in a second ACL. Then, any entry for which c1 && c2 is provably false is removed. For example, if one ACE matches only those packets whose destination address is X and another matches only those packets whose destination address is Y, then it is provably impossible for any packet to match both ACEs at the same time, if X is not equal to Y.

In mathematical terms, this can be specified as follows: Suppose, for the purposes of comparing against an ACE, each packet is represented by an ordered sequence of binary values, each element being 0 or 1. An ACE match condition "c" can be represented as a string of ternary elements, where each element has a value of 0, 1, or X, then it is possible for a packet to match two match conditions c1 and c2 if and only if: for all i, the ith element in c1 is X, or the ith element in c2 is X, or the ith element in c1 is equal to the ith element in c2.

The elimination of impossible matches may be implemented by eliminating any entry <c2,A2> for which there exists some prior entry <c1,A1> such that c1 subsumes c2. For purposes of this example, "c1 subsumes c2" shall mean that c2 is provably a logical subset of c1. The implementation of the elimination of impossible matches may be performed using a doubly-nested loop type algorithm for each entry in an ACL, or other similar appropriate algorithms.

According to an embodiment, after the elimination of skips and the elimination of impossible ACE entries, a single ACL is produced that includes only terminal entries and the replaced skip entries. A set of actions is associated with each entry in the single ACL list. Advantageously, each entry in the single list can be mapped to one or more of the original ACLs prior to the encoding. The mapping enables recording of accurate hit statistics recorded in a "hit counter" or "match counter". More particularly, the hit statistics for an entry prior to encoding can be determined by summing the hit statistics on all entries that have been combined to produce that entry.

The single list created may be optimized by including testing for unreachable elements that may not be capable of being matched. Further optimization may include checking each ACE with all other ACEs to determine whether a prior ACE is subsumed by a subsequent ACE, as stated above.

The method may include recording in hardware device 220, such as a CAM or TCAM, an indication of a source of an entry with an action code to create a pairing; and carrying one or more of the pairings to the hardware device 220 as a field. In one embodiment, the method includes using counters, the counters can be configured to provide an intrusion detection system.

Figure 5:
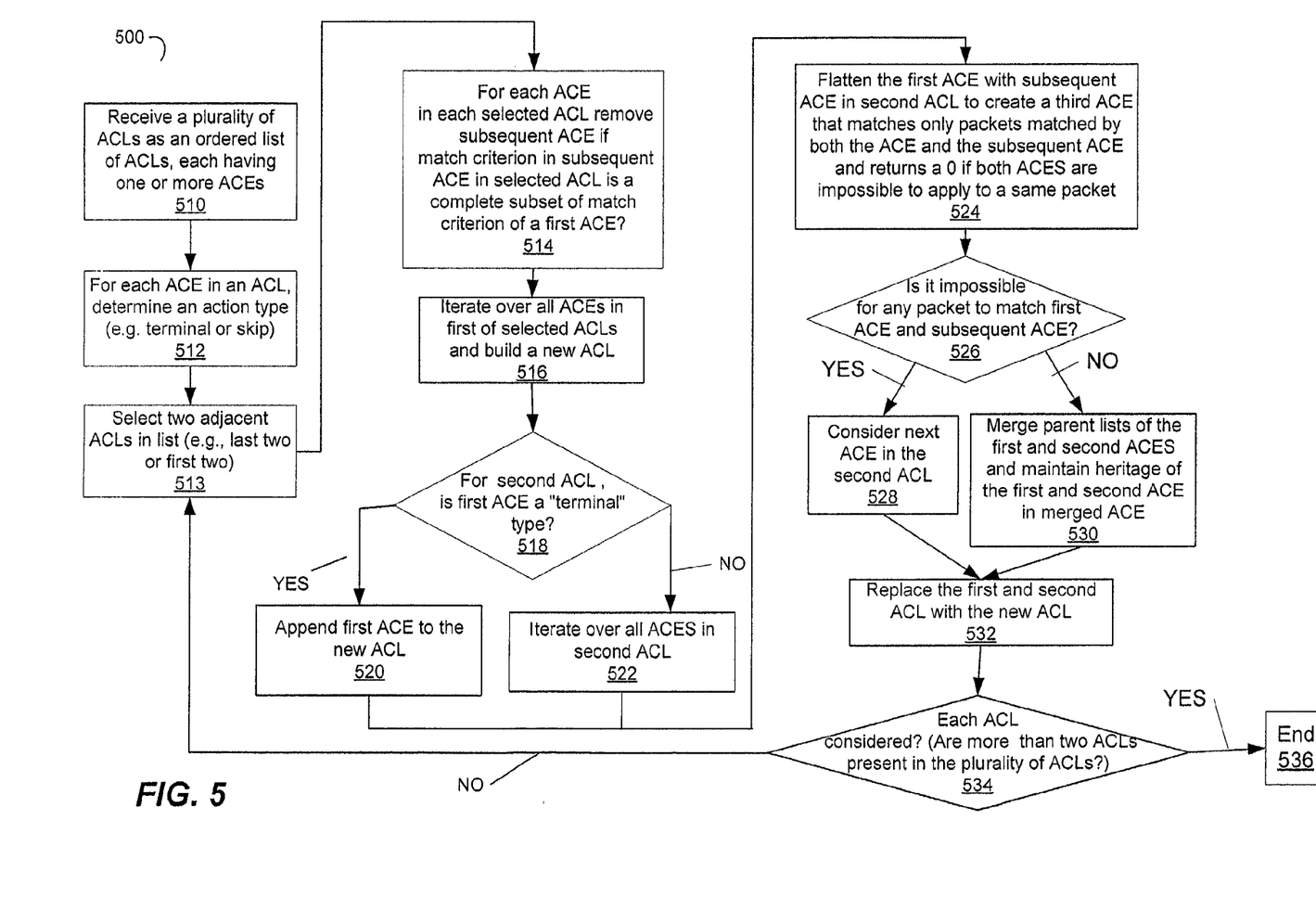
FIG. 5 illustrates a flow diagram of one or more methods in accordance with an embodiment of the present invention.

Referring now to FIG. 5, a flow diagram of one or more methods described herein is shown. The flow diagram 500 shows that two or more ACLs, such as lists L1 and L2 will produce a single, or "flattened" list, of a size no larger than:

$$\text{skips}(L1)*\text{size}(L2)+\text{terminal\_entries}(L1)$$

Thus, for example, lists with 16 skips and 4 permits can produce a flattened list with no more than 4*20+16=96 entries. Moreover, with the elimination of impossible entries as provided for above, the number of entries is further reduced.

More specifically, referring to FIG. 5, block 510 provides for receiving a plurality of ACLs, each having one or more ACEs. Block 512 provides for determining for each ACE in an ACL an action type. An action type may be a terminal, a skip or other action type as is known.

Block 514 provides that for each ACE in each selected ACL, a subsequent ACE is removed if match criterion in the subsequent ACE in the selected ACL is a complete subset of match criterion of a first ACE. Next, in block 516, the method provides for iterating over all ACEs in the first of the selected ACLs to build a new ACL.

Block 518 provides for determining whether, in the second ACL, the first ACE is of a "terminal" type. If so, block 520 provides for appending the first ACE to the new ACL. If not, block 522 provides for iterating over all ACEs in the second ACL to determine terminal types.

After blocks 520 and 522, block 524 then provides for flattening the first ACE with a subsequent ACE in the second ACL to create a third ACE that matches only packets matched by both the ACE and the subsequent ACE. Block 524 also provides for returning a 0 if both ACEs are impossible to apply to a same packet.

Block 526 provides for determining whether it is impossible for any packet to match the first ACE and the subsequent ACE. If so, block 528 provides for considering the next ACE in the second ACL. If not, block 530 provides for merging parent lists of the first and second ACEs and maintaining the heritage of the first and second ACEs in a merged ACE.

Next, block 532 provides for replacing the first and second ACL with a new ACL formed by applying the blocks described above. Block 534 provides for determining whether each ACL has been considered. For example, if there are only two ACLs, each has been considered. However, if there are more than two in the plurality of ACLs, block 534 directs the method back to block 513 for reapplying blocks 513 through 532. Otherwise, block 536 ends the method.

Advantageously, the methods and system presented herein reduce the code complexity relative to current prior art methods of loading ACLs into a TCAM or similar device and preserve statistics, such as data in a "hit counter," on all user-specified entries into the hardware device. Further the system and methods provided allow mapping or tracing back from an entry to the component user-specified ACEs that produced the entry. Further, embodiments of the present invention provide a more efficient list of entries that are codeable for hardware device 220, thereby providing accelerated software handling of packets of data for circumstances including when a packet "hits" or "matches" multiple feature-type ACLs Additionally, the methods presented herein provide predictable worst-case behavior. More particularly, the system and methods herein provide a predictable upper bound on the number of ACEs in the single flattened ACL as a function of the size of the original ACLs. This upper bound is approximately equal to the product of the sizes of all merged ACLs.

OTHER EMBODIMENTS

Those skilled in the art will appreciate that embodiments disclosed herein may be implemented as software program instructions capable of being distributed as one or more program products, in a variety of forms including computer program products, and that the present invention applies equally regardless of the particular type of program storage media or signal bearing media used to actually carry out the distribution. Examples of program storage media and signal bearing media include recordable type media such as floppy disks, CD-ROM, and magnetic tape transmission type media such as digital and analog communications links, as well as other media storage and distribution systems.

Additionally, the foregoing detailed description has set forth various embodiments of the present invention via the use of block diagrams, flowcharts, and/or examples. It will be understood by those skilled within the art that each block diagram component, flowchart step, and operations and/or components illustrated by the use of examples can be implemented, individually and/or collectively, by a wide range of hardware, software, firmware, or any combination thereof. The present invention may be implemented as those skilled in the art will recognize, in whole or in part, in standard Integrated Circuits, Application Specific Integrated Circuits (ASICs), as a computer program running on a general-purpose machine having appropriate hardware, such as one or more computers, as firmware, or as virtually any combination thereof and that designing the circuitry and/or writing the code for the software or firmware would be well within the skill of one of ordinary skill in the art, in view of this disclosure.

Although particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for transforming one or more lists for a data communications system into a single list, each list of the one or more lists including a plurality of entries, the method comprising:
    removing non-terminating entries from the plurality of entries in the one or more lists, the removing each non-terminating entry removing all but a last non-terminating entry in any of the one or more lists;
    determining whether one or more entries of the plurality of entries provides for an impossible action, wherein
        each entry of the plurality of entries comprises an associated condition, and
        said determining comprises
            selecting a first entry of the plurality of entries, and
            for each entry of the plurality of entries except the first entry,
                determining whether the condition associated with the entry can be satisfied if a first condition associated with the first entry is satisfied, and identifying the entry as providing for an impossible action if the condition associated with the entry cannot be satisfied; and
    eliminating from the plurality of entries the one or more entries, if any, that provide for an impossible action, wherein
        the removing of non-terminating entries and the eliminating of the one or more entries that provide for an impossible action, if any, produce a single list preserving tracing of the entries in the single list to the plurality of entries.

2. The method of claim 1 wherein each of the plurality of entries provides an indication of a source of the entry with an action code to create a pairing.

3. The method of claim 1 wherein the preserving tracing permits determining statistical parameters of the data communication system.

4. The method of claim 3 wherein the statistical parameters include counts of matched entries.

5. The method of claim 1 wherein the removing and the eliminating is performed at a network element of the data communication system.

6. The method of claim 1 wherein the list of entries is an Action Control List (ACL) and wherein each entry is an Action Control Entry (ACE).

7. The method of claim 1 wherein the one or more lists of data are action control lists (ACLs), the method further comprising:
    combining at least a first and a second ACL by combining each non-terminating entry in a first ACL with each entry in a second ACL; and
    repeating the combining recursively to a third or more ACLs, if present, until each ACL is collapsed into the first ACL to create the single list.

8. The method of claim 7 wherein the single list holds a plurality of Action Control Entries (ACEs) that are codeable into a first match engine capable of computing a large number of Boolean expressions in parallel and returning an index of first matching ACEs.

9. The method of claim 8 wherein the first match engine is implemented as one of a ternary content addressable memory (TCAM) and a hardware device capable of computing a large number of Boolean expressions in parallel and returning an index of first matching ACEs.

10. A data routing system to administer entries, the data routing system comprising:

a network element configured to receive a plurality of
   Action Control Lists (ACLs) organized to hold a plurality of Action Control Entries (ACEs);
a processor configured to
   receive the plurality of ACLs holding the plurality of ACEs,
   remove any non-terminating entries from the plurality of ACEs in the plurality of ACLs, wherein the removal of each non-terminating entry removes all but a last non-terminating entry in any of the ACLs,
   determine whether one or more ACEs of the plurality of ACEs provides for an impossible action, wherein
      each ACE of the plurality of ACEs comprises an associated condition, and
      the processor is further configured to
         select a first ACE from the plurality of ACEs, and
         for each ACE of the plurality of ACEs except the first ACE, determine whether the condition associated with the ACE can be satisfied if a first condition associated with the first ACE is satisfied, and identify the ACE as providing for an impossible action if the condition associated with the ACE cannot be satisified; and
   eliminate from the plurality of ACEs the one or more ACEs that provide for an impossible action if present, wherein the removal of non-terminating entries and the elimination of one or more ACEs that provide for an impossible action produces a single list with entries, the single list configured to preserve tracing of the entries in the single list to the plurality of ACEs.

11. The data routing system of claim 10 further comprising:
   a hardware device coupled to receive the single list with entries, the hardware device being a parallel-first match engine.

12. The data routing system of claim 11 wherein the hardware device is one of a content addressable memory and a ternary content addressable memory.

13. The data routing system of claim 11 wherein the single list with entries is coded for presentation to the hardware device.

14. The data routing system of claim 10 wherein the one or more ACEs provide for a plurality of actions.

15. The data routing system of claim 10 wherein the one or more ACEs provide for one or more of:
   encryption and decryption, web caching, tunneling, redirection to a predetermined router interface, redirection to a separate processor or linecard for one or more of the encryption, decryption, web caching, and tunneling.

16. A computer system comprising:
a processor; and
a memory, the memory including instructions executable by the processor, the instructions including encoding instructions for one or more lists, each list including a plurality of entries, the encoding instructions comprising
   skip entry removal instructions for removing non-terminating entries from the plurality of entries in the one or more lists, the removing each non-terminating entry removing all but a last non-terminating entry in any of the one or more lists,
   impossibility entry determination instructions for determining whether one or more entries of the plurality of entries provides for an impossible action, wherein each entry of the plurality of entries comprises an associated condition, and
      the impossibility entry determination instructions further comprise
         selection instructions for selecting a first entry in the plurality of entries, and
         impossibility identification instructions for identifying an impossible action for each entry of the plurality of entries except the first entry further comprising
            a first set of instructions for determining whether the condition associated with the entry can be satisfied if a first condition associated with the first entry is satisfied, and
            a second set of instructions for identifying the entry as providing for an impossible action if the condition associated with the entry cannot be satisfied, and
   impossibility entry elimination instructions for removing from the plurality of entries the one or more entries that provide for an impossible action, if any, wherein the removal of non-terminating entries and the removal of the one or more entries that provide for an impossible action produce a single list preserving tracing of the entries in the single list to the plurality of entries.

17. A computer program product comprising:
signal bearing media bearing digital information adapted to include programming, the digital information including:
   a block configured to remove non-terminating entries from a plurality of entries in one or more lists, the block further configured to remove all but a last non-terminating entry in any of the one or more lists;
   a block configured to determine whether one or more entries of the plurality of entries provides for an impossible action, wherein each entry of the plurality of entries comprises an associated condition, and
      the block is further configured to select a first entry of the plurality of entries, and
      for each entry of the plurality of entries,
         determine whether the condition associated with the entry can be satisfied if a first condition associated with the first entry is satisified, and identify the entry as providing for an impossible action if the condition associated with the entry cannot be satisified; and
   a block configured to eliminate from the plurality of entries the one or more entries that provide for an impossible action, wherein
      the removal of non-terminating entries and the elimination of one or more entries that provide for an impossible action produce a single list preserving tracing of the entries in the single list to the plurality of entries.

18. A network element configured to transform one or more lists for a network, each list including one or more entries, the network element comprising:
   means for removing non-terminating entries from the one or more entries in the one or more lists, the removing each non-terminating entry removing all but a last non-terminating entry in any of the one or more lists;
   means for determining whether a subset of entries of the one or more of entries provide for an impossible action, wherein
each entry of the one or more entries comprises an associated condition, and
said means for determining comprises
    means for selecting a first entry of the one or more entries, and
    for each entry of the one or more entries except the first entry,
        means for determining whether the condition associated with the entry can be satisified if a first condition associated with the first entry is satisfied, and
        means for identifying the entry as a member of the subset of entries providing for an impossible action if the condition associated with the entry cannot be satisfied; and
means for eliminating from the one or more entries the subset of entries that provide for an impossible action, wherein the means for removing of non-terminating entries and the means for eliminating the subset of entries that provide for an impossible action provide a means for producing a single list preserving tracing of the entries in the single list to the one or more entries.

* * * * *